US 8,228,365 B2

(12) United States Patent
Toma et al.

(10) Patent No.: US 8,228,365 B2
(45) Date of Patent: Jul. 24, 2012

(54) IMAGE CONVERSION APPARATUS AND IMAGE CONVERSION METHOD

(75) Inventors: Hideyuki Toma, Kodaira (JP); Tokuhiro Sakurai, Akishima (JP); Teruo Kinoshita, Nishitama-gun (JP); Masatsugu Mukuge, Hiratsuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/080,535

(22) Filed: Apr. 5, 2011

(65) Prior Publication Data

US 2011/0293249 A1 Dec. 1, 2011

(30) Foreign Application Priority Data

May 31, 2010 (JP) .................................. 2010-125134

(51) Int. Cl.
*H04N 13/00* (2006.01)
*G06K 9/36* (2006.01)
(52) U.S. Cl. .......................................... 348/42; 382/285
(58) Field of Classification Search .................. None
See application file for complete search history.

(56) References Cited

U.S. PATENT DOCUMENTS

| 2006/0001554 A1 | 1/2006 | Morishita |
| 2006/0103664 A1 | 5/2006 | Nakanishi |
| 2007/0165304 A1 | 7/2007 | Tomita |
| 2009/0185029 A1 | 7/2009 | Mitsuhashi et al. |
| 2010/0182402 A1 | 7/2010 | Nakajima et al. |
| 2011/0141236 A1 | 6/2011 | Mitani et al. |
| 2011/0157310 A1 | 6/2011 | Mitani et al. |
| 2011/0292035 A1 | 12/2011 | Sakurai et al. |
| 2011/0292177 A1 | 12/2011 | Sakurai et al. |
| 2011/0293248 A1 | 12/2011 | Toma et al. |

FOREIGN PATENT DOCUMENTS

| JP | 08-182023 | 7/1996 |
| JP | 09-107562 | 4/1997 |
| JP | 2004-021285 | 3/2004 |
| JP | 2006-019890 | 1/2006 |
| JP | 2006-121553 | 5/2006 |
| JP | 2006-157605 | 6/2006 |
| JP | 2007-065067 | 3/2007 |
| JP | 2007-243818 | 8/2007 |
| JP | 2008-042645 | 2/2008 |
| JP | 2008-187253 | 8/2008 |

(Continued)

OTHER PUBLICATIONS

Japanese Patent Application No. 2010-125134; Notice of Reasons for Rejection; Mailed Jul. 5, 2011 (with English translation).

(Continued)

*Primary Examiner* — Joseph Ustaris
*Assistant Examiner* — Frederick Bailey
(74) *Attorney, Agent, or Firm* — Blakely, Sokoloff, Taylor & Zafman LLP

(57) ABSTRACT

According to one embodiment, an image conversion apparatus includes a 3D conversion instruction module, a determination module, and a converter. The 3D conversion instruction module is configured to instruct execution of a 3D conversion required to convert an input image into a 3D image. The determination module is configured to determine validity or invalidity of the 3D conversion instruction based on a type of the input image. The converter is configured to convert, based on validity determination of the 3D conversion instruction, the input image into the 3D image in response to the 3D conversion instruction.

15 Claims, 7 Drawing Sheets

FOREIGN PATENT DOCUMENTS

| | | |
|---|---|---|
| JP | 2009-118354 | 5/2009 |
| JP | 2009-296144 | 12/2009 |
| JP | 2010-028261 | 2/2010 |
| WO | WO 2004/021285 | 11/2004 |
| WO | WO 2010-026737 | 3/2010 |

OTHER PUBLICATIONS

Japanese Patent Application No. 2010-125133, Notice of Reasons for Rejection, mailed Jul. 5, 2011, (with English Translation).

Japanese Patent Application No. 2010-125132, Notice of Reasons for Rejection, mailed Jul. 5, 2011, (with English Translation).

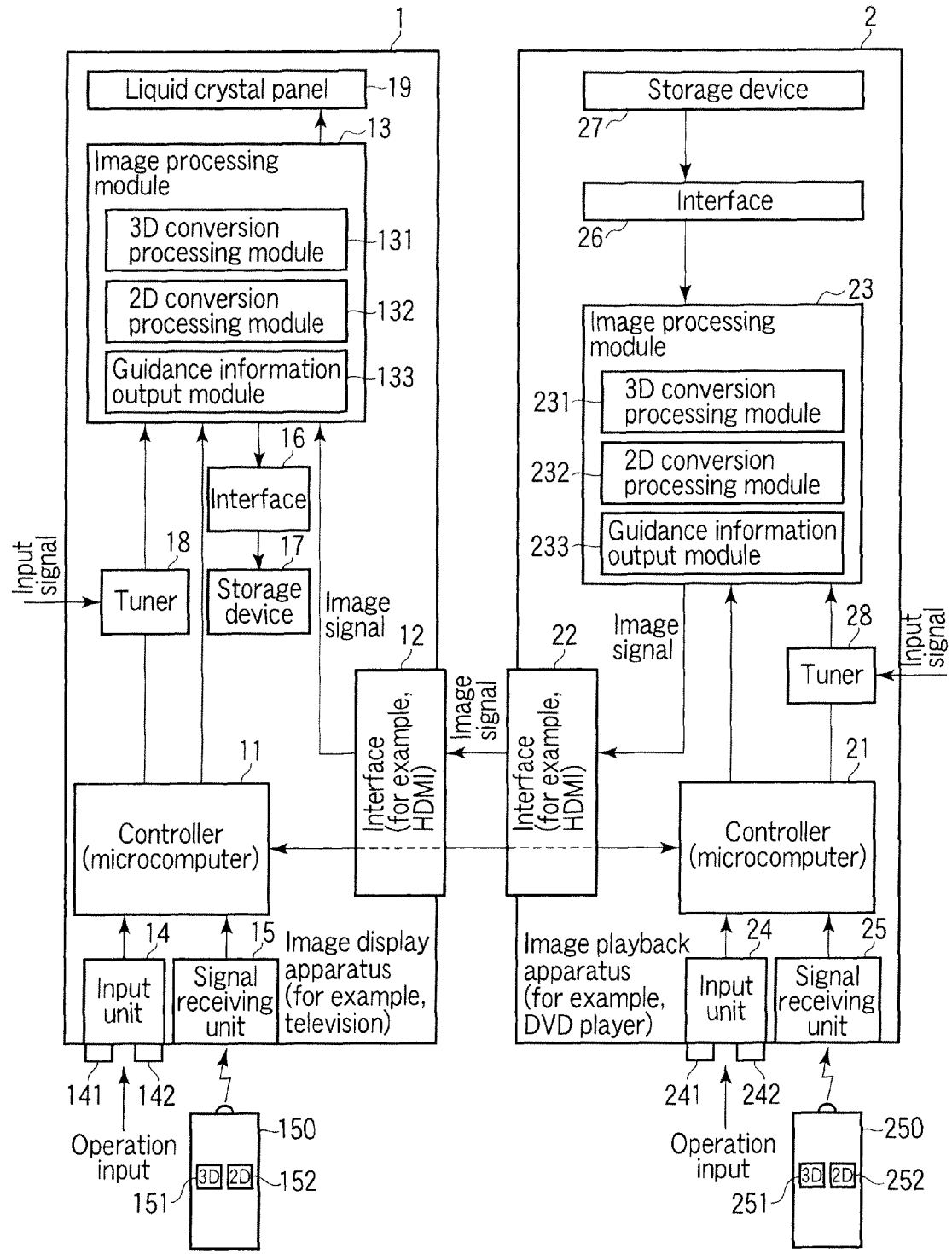
F I G. 1

| Image playback apparatus side | | | Conversion instruction and result of image display apparatus (television) side | |
|---|---|---|---|---|
| Conversion capability | Content type | Conversion processing | 3D conversion instruction by 2D→3D conversion key | 2D conversion instruction by 3D→2D conversion key |
| Without conversion function (normal player) | 2D | No conversion | Execute 3D conversion, and output converted 3D image | Output 2D image intact without conversion |
| | 3D | No conversion | Output 3D image intact without conversion | Execute 2D conversion, and output converted 2D image |
| With 2D→3D conversion function | 2D | No conversion | Execute 3D conversion, and output converted 3D image | Output 3D image intact without conversion |
| | 2D | 2D→3D | Instruct to cancel conversion on image playback apparatus side, execute 3D conversion on image display apparatus side, and output converted 3D image | Instruct to cancel conversion on player side, and output 2D image intact |
| | 3D | No conversion | Output 3D image intact without conversion | Execute 2D conversion, and output converted 2D image |
| With 3D→2D conversion function | 2D | No conversion | Execute 3D conversion, and output converted 3D image | Output 2D image intact without conversion |
| | 3D | 3D→2D | Instruct to cancel conversion on image playback apparatus side, execute 2D conversion on image display apparatus side, and output 3D image intact | Instruct to cancel conversion on player side, execute 2D conversion on image display apparatus side, and output converted 2D image |
| | 3D | No conversion | Output 3D image intact without conversion | Execute 2D conversion, and output converted 2D image |

FIG. 4

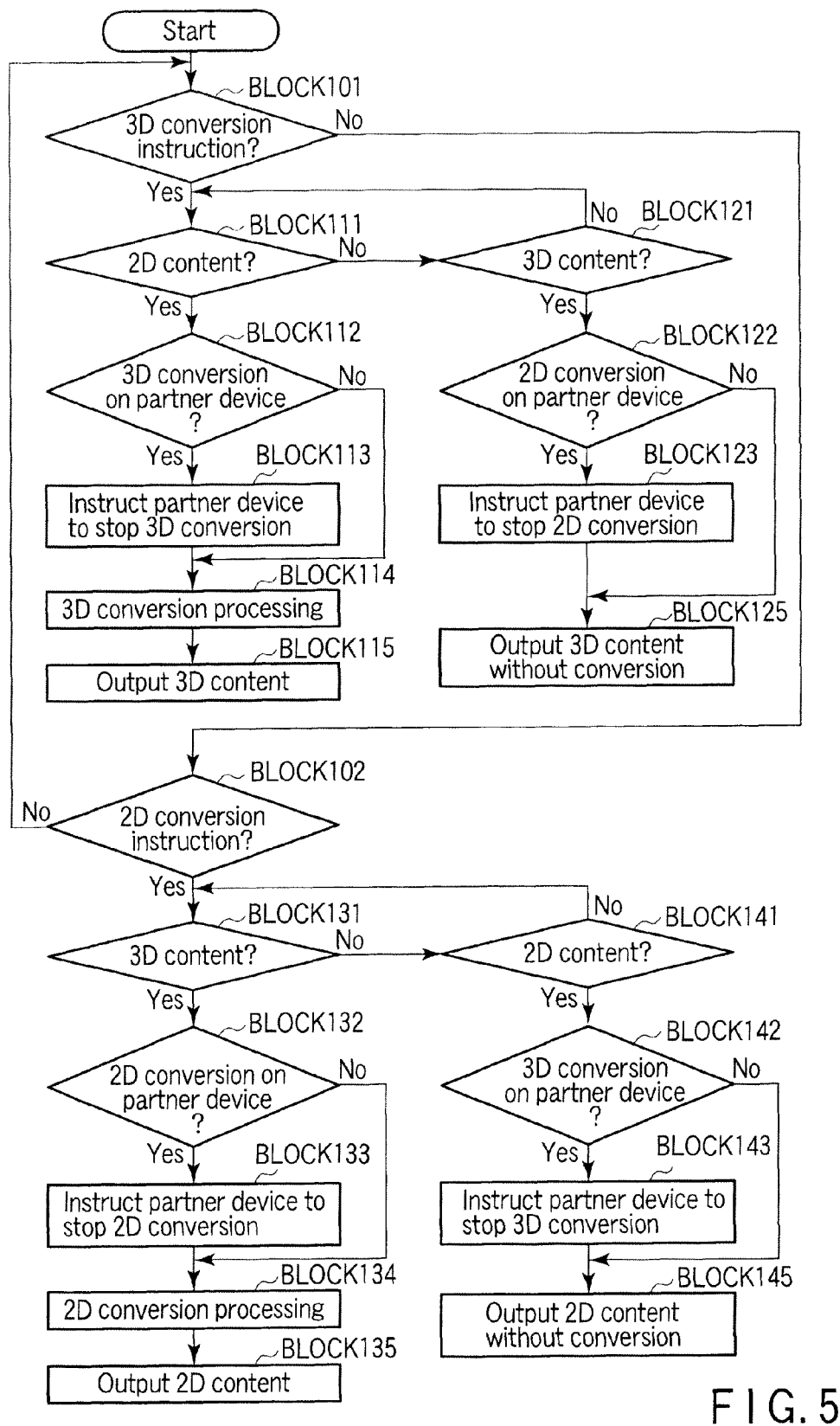
F I G. 5

| Image source on image playback apparatus side | Conversion processing | Conversion instruction and result of image display apparatus (television) side | |
|---|---|---|---|
| | | 3D conversion instruction by 2D→3D conversion key | 2D conversion instruction by 3D→2D conversion key |
| 2D package medium | No conversion | Execute 3D conversion, and output image (without saving) | Output image without conversion |
| 3D package medium | No conversion | Output image without conversion | Execute 2D conversion, and output image (without saving) |
| 2D user-generated content (2D non-package content) | No conversion | Execute 3D conversion, output image, and save 3D-converted image | Output image without conversion |
| | Converted | Output image without conversion (inform 2D-converted content) | Output image without conversion |
| 3D user-generated content (3D non-package content) | No conversion | Output image without conversion | Execute 2D conversion, output image, and save 2D-converted image |
| | Converted | Output image without conversion | Output image without conversion (inform 3D-converted content) |

F I G. 6

IMAGE CONVERSION APPARATUS AND IMAGE CONVERSION METHOD

CROSS-REFERENCE TO RELATED APPLICATIONS

This application is based upon and claims the benefit of priority from Japanese Patent Application No. 2010-125134, filed May 31, 2010; the entire contents of which are incorporated herein by reference.

FIELD

Embodiments described herein relate generally to an image conversion apparatus and image conversion method.

BACKGROUND

Nowadays, a full-fledged television which can display three-dimensional (3D) images (to be referred to as a 3D television hereinafter) is about to come into the market. Various techniques required to display 3D images have been disclosed and put into practical use so far. However, since the brightness and resolution of a 3D image are inferior to those of a two-dimensional (2D) image, 3D televisions are unfamiliar.

However, in recent years, due to the advent of large-capacity optical discs such as a Blu-ray (BD®) and the prevalence of full-HD televisions, 3D images having high image quality can be played back by, for example, a frame sequential method.

Therefore, the 3D televisions will become widespread exponentially in the future. However, the amount of available 3D image content is still small. Against such a background, a technique for converting 2D image content into 3D image content, and generating pseudo-3D images based on the converted 3D image content (2D-3D conversion technique) has been disclosed.

As described above, the 2D-3D conversion technique has been disclosed, and televisions incorporating the 2D-3D conversion technique have been proposed. However, various playback apparatuses may be connected to a television, and miscellaneous image content may be input to the television.

A technique which controls 2D-3D conversion according to input image content has not been disclosed yet. The user does not always want to view a converted image (for example, a 3D image), and often wants to view an original image (for example, a 2D image). A technique which controls 2D-3D conversion as the situation demands has not been disclosed yet.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an example of an image display system common to the first to third embodiments;

FIG. 4 is a table showing first to fourth image conversion control examples to be described in the first embodiment;

FIG. 5 is a flowchart showing the first to fourth image conversion control examples to be described in the first embodiment;

FIG. 6 is a table showing fifth and sixth image conversion control examples and first and second recording control examples to be described in the second embodiment.

DETAILED DESCRIPTION

Figure 2:
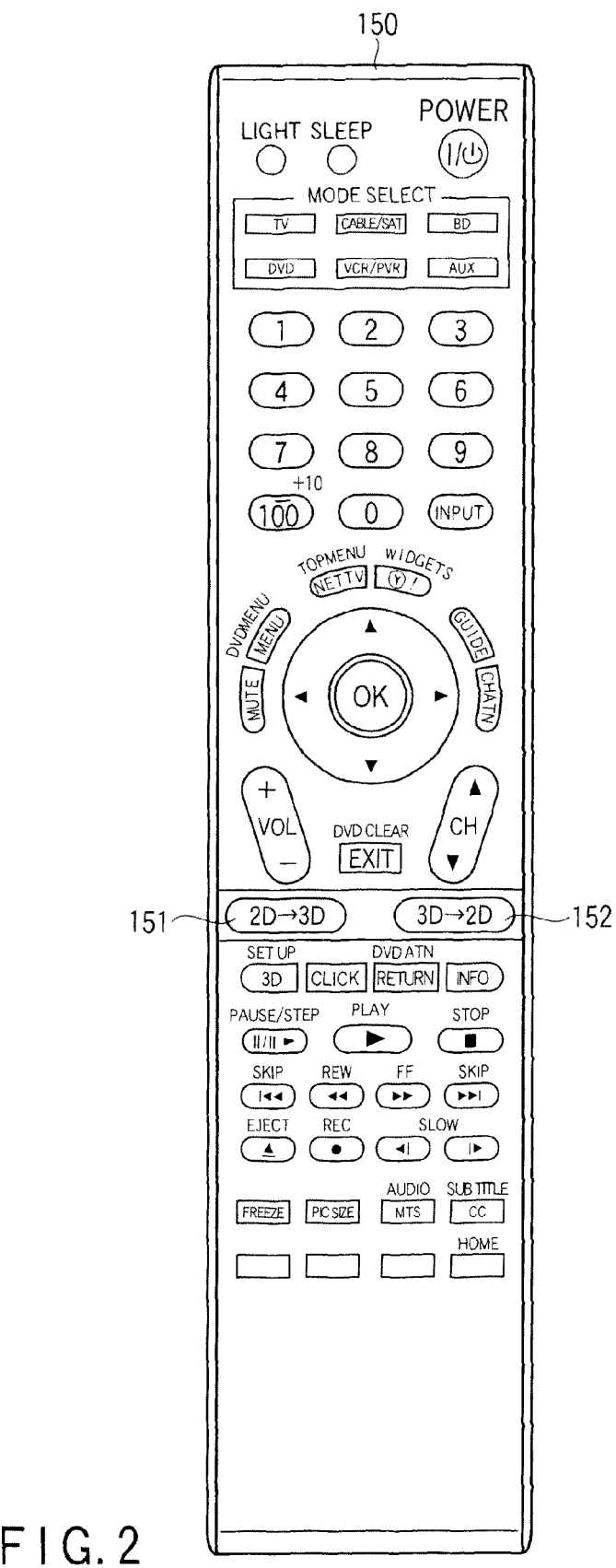
FIG. 2 is a view showing an example of a remote controller compatible with an image display apparatus shown in FIG. 1.

Various embodiments will be described hereinafter with reference to the accompanying drawings.

In general, according to one embodiment, an image conversion apparatus includes a 3D conversion instruction module, a determination module, and a converter. The 3D conversion instruction module is configured to instruct execution of a 3D conversion required to convert an input image into a 3D image. The determination module is configured to determine validity or invalidity of the 3D conversion instruction based on a type of the input image. The converter is configured to convert, based on validity determination of the 3D conversion instruction, the input image into the 3D image in response to the 3D conversion instruction.

The first to third embodiments will be described hereinafter with reference to the drawings.

FIG. 1 is a block diagram showing an example of an image display system common to the first to third embodiments. As shown in FIG. 1, the image display system is configured by, for example, an image display apparatus 1 and image playback apparatus 2. The image display apparatus 1 is, for example, a digital television receiver. The image playback apparatus 2 is, for example, a DVD player, BD player, or set-top box.

The image display apparatus 1 includes a controller (control module) 11, interface 12, image processing module 13, input unit 14, signal receiving unit 15, interface 16, storage device 17, tuner 18, and liquid crystal panel 19. The image playback apparatus 2 includes a controller (control module) 21, interface 22, image processing module 23, input unit 24, signal receiving unit 25, interface 26, storage device 27, and tuner 28. The storage devices 17 and 27 include, for example, a DVD, BD, or HDD.

The image display apparatus 1 is configured to be connectable to the image playback apparatus 2 (that is, the interface 22) via the interface 12. In other words, the image playback apparatus 2 is configured to be connectable to the image display apparatus 1 (that is, the interface 12) via the interface 22.

The interfaces 12 and 22 are two-way communication units, and are interfaces which are compliant with, for example, the High-Definition Multimedia Interface (HDMI®) standard. The image playback apparatus 2 can transmit image and audio signals to the image display apparatus 1 via the interface 22, and the image display apparatus 1 can receive the image and audio signals transmitted from the image playback apparatus 2 via the interface 12. Furthermore, the HDMI standard specifies a Consumer Electronics Control (HDMI-CEC) standard. By the HDMI-CEC functions of the interfaces 12 and 22, the controller 21 of the image playback apparatus 2 can transmit control signals to the image display apparatus 1 via the interface 22, and the image display apparatus 1 can receive the control signals transmitted from the image playback apparatus 2 via the interface 12.

Then, the controller 11 of the image display apparatus 1 can control various operations based on the received control signals.

As described above, the interfaces 12 and 22 are configured to exchange control signals. With this configuration, when the image display apparatus 1 and image playback apparatus 2 are connected via the interfaces 12 and 22, the controller 11 of the image display apparatus 1 can notify the image playback apparatus 2 of the processing capability of the image processing module 13 via the interfaces 12 and 22, and the controller 21 of the image playback apparatus 2 can notify the image display apparatus 1 of the processing capability of the image processing module 23 via the interfaces 12 and 22.

That is, when the image display apparatus 1 and image playback apparatus 2 are connected via the interfaces 12 and 22, the controller 11 of the image display apparatus 1 can detect connection of the image playback apparatus 2 and also the processing capability of the image processing module 23. Also, the controller 21 of the image playback apparatus 2 can detect connection of the image display apparatus 1 and also the processing capability of the image processing module 13.

The input unit 14 includes a plurality of keys such as a 3D conversion key (2D→3D conversion key) 141 and 2D conversion key (3D→2D conversion key) 142. The 3D conversion key 141 is a key used to instruct execution of 3D conversion for converting an input image into a 3D image. The 2D conversion key 142 is a key used to instruct execution of 2D conversion for converting an input image into a 2D image. The signal receiving unit 15 receives a signal from a remote controller 150 shown in FIG. 2. As shown in FIG. 2, the remote controller 150 includes a plurality of keys such as a 3D conversion key (2D→3D conversion key) 151 and 2D conversion key (3D→2D conversion key) 152. The 3D conversion key 151 is substantially the same as the 3D conversion key 141, and a description of its function will not be given. Also, the 2D conversion key 152 is substantially the same as the 2D conversion key 142, and a description of its function will not be given.

Note that, for example, a single 2D/3D conversion key may be arranged in place of the 3D conversion key 141 and 2D conversion key 142. For example, when the user presses this 2D/3D conversion key once, the 2D/3D conversion key issues a 3D conversion instruction for converting an input image into a 3D image. When the user presses this 2D/3D conversion key twice successively, the 2D/3D conversion key issues a 2D conversion instruction for converting an input image into a 2D image.

Figure 3:
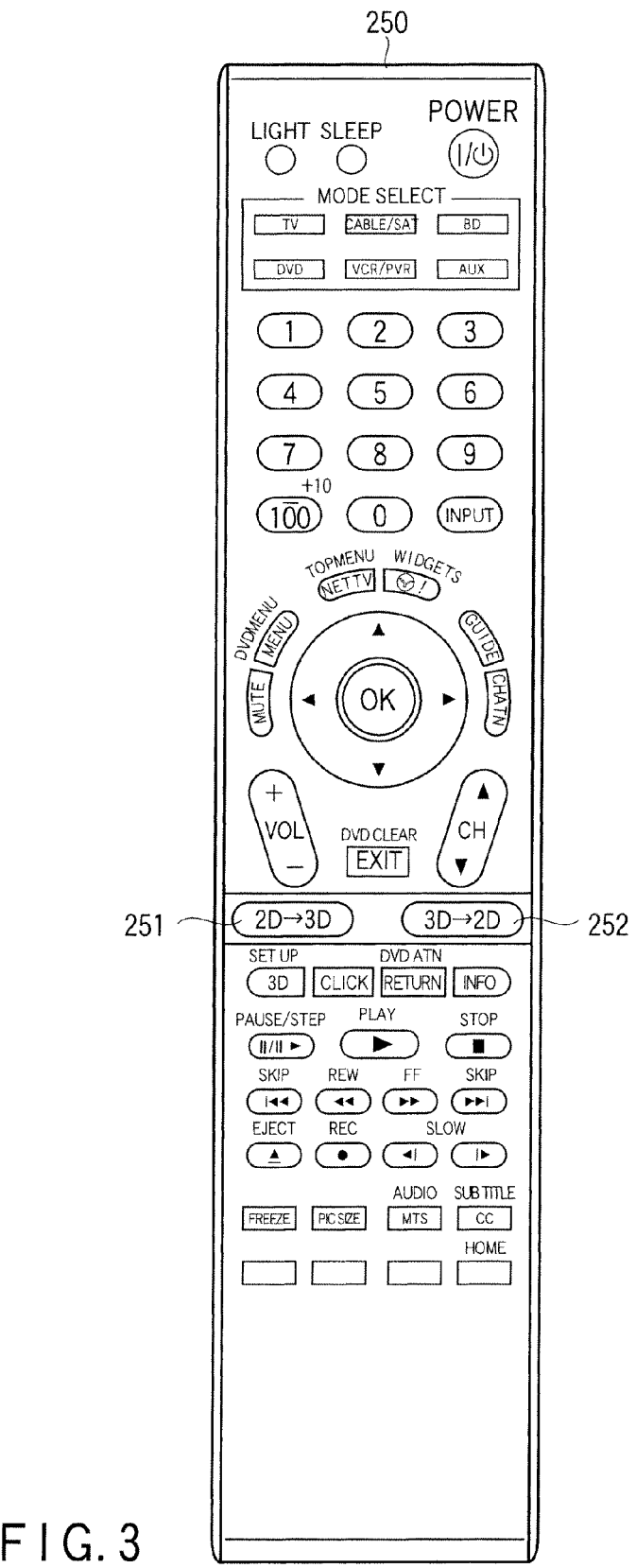
FIG. 3 is a view showing an example of a remote controller compatible with an image playback apparatus shown in FIG. 1.

Likewise, the input unit 24 includes a plurality of keys such as a 3D conversion key (2D→3D conversion key) 241 and 2D conversion key (3D→2D conversion key) 242. The signal receiving unit 25 receives a signal from a remote controller 250 shown in FIG. 3. As shown in FIG. 3, the remote controller 250 includes a plurality of keys such as a 3D conversion key (2D 3D conversion key) 251 and 2D conversion key (3D→2D conversion key) 252. Furthermore, for example, a single 2D/3D conversion key may be arranged in place of the 3D conversion key 241 and 2D conversion key 242.

The image processing module 23 includes a 3D conversion processing module 231, 2D conversion processing module 232, and guidance information output module 233. The 3D conversion processing module 231 converts an original image signal (2D image signal) from the storage device 27 or tuner 28 into a 3D image signal, and outputs the 3D image signal. That is, the 3D conversion processing module 231 converts an original image signal (2D image signal) input via the interface 26 into a 3D image signal, and outputs the 3D image signal.

The 2D conversion processing module 232 converts an original image signal (3D image signal) from the storage device 27 or tuner 28 into a 2D image signal, and outputs the 2D image signal. That is, the 2D conversion processing module 232 converts an original image signal (3D image signal) input via the interface 26 into a 2D image signal, and outputs the 2D image signal. The guidance information output module 233 outputs guidance image signals corresponding to various kinds of guidance information.

Note that the image processing module 23 can output a 2D-converted 2D image signal or 3D-converted 3D image signal, as described above, and can also output an original image signal (2D or 3D image signal) intact.

The interface 22 can output a 2D image signal, 3D image signal, or guidance image signal output from the image processing module 23. Alternatively the interface 22 can output a 2D composite image signal obtained by compositing a 2D image signal and guidance image signal, or a 3D composite image signal obtained by compositing a 3D image signal and guidance image signal. Alternatively the interface 22 outputs an original image signal (2D or 3D image signal).

The interface 12 can receive the aforementioned 2D image signal, 3D image signal, or guidance image signal. Alternatively the interface 12 can receive the aforementioned 2D or 3D composite image signal. Alternatively the interface 12 can receive the original image signal (2D or 3D image signal).

The image processing module 13 includes a 3D conversion processing module 131, 2D conversion processing module 132, and guidance information output module 133. The 3D conversion processing module 131 converts an input image signal (2D image signal or 2D composite image signal) input via the interface 12 or tuner 18 into a 3D image signal, and outputs the 3D image signal. The 2D conversion processing module 132 converts an input image signal (3D image signal or 3D composite image signal) input via the interface 12 or tuner 18 into a 2D image signal, and outputs the 2D image signal. The guidance information output module 133 outputs guidance image signals corresponding to various kinds of guidance information.

The liquid crystal panel 19 displays an image based on at least one image signal of a 2D image signal and guidance image signal output from the image processing module 13. For example, when the image processing module 13 composites a 2D image signal and guidance image signal and outputs a 2D composite image signal, the liquid crystal panel 19 can display a 2D image corresponding to the 2D image signal, and a guidance image corresponding to the guidance image signal to be superimposed on the displayed 2D image.

Alternatively the liquid crystal panel 19 displays an image based on at least one image signal of a 3D image signal and guidance image signal output from the image processing module 13. For example, when the image processing module 13 composites a 3D image signal and guidance image signal and outputs a 3D composite image signal, the liquid crystal panel 19 can display a 3D image corresponding to the 3D image signal, and a guidance image corresponding to the guidance image signal to be superimposed on the displayed 3D image.

Note that 3D conversion processing and 2D conversion processing disclosed in, for example, Jpn. Pat. Appln. KOKAI Publication No. 2006-121553 can be applied to the 3D conversion processing in the 3D conversion processing modules 131 and 231 and the 2D conversion processing in the 2D conversion processing modules 132 and 232.

The image conversion control by the image display apparatus 1 will be described below.

As described above, the input unit 14 of the image display apparatus 1 includes the 3D conversion key (2D→3D conversion key) 141 and 2D conversion key (3D→2D conversion key) 142. The user who wants to display a 3D image presses, for example, the 3D conversion key 141. In response to the pressing of the 3D conversion key 141, the input unit 14 issues a 3D conversion instruction to the controller 11. The controller 11 determines based on various conditions whether or not the 3D conversion instruction is valid. When it is determined that the 3D conversion instruction is valid, the controller 11 issues the 3D conversion instruction to the image processing module 13.

The user who wants to display a 2D image for the reason that he or she does not want to use 3D spectacles presses, for example, the 2D conversion key 142. In response to the pressing of the 2D conversion key 142, the input unit 14 issues a 2D conversion instruction to the controller 11. The controller 11 determines based on various conditions whether or not the 2D conversion instruction is valid. When it is determined that the 2D conversion instruction is valid, the controller 11 issues the 2D conversion instruction to the image processing module 13.

For example, the controller 11 determines based on at least one of the type of an input image signal input to the image processing module 13 and an image conversion capability of the image playback apparatus 2 whether or not the 3D conversion instruction is valid and whether or not the 2D conversion instruction is valid (see FIGS. 4 and 5). This control will be described in detail below.

First Embodiment (1) First image conversion control executed when a 3D conversion instruction is input by the 3D conversion key 141 of the image display apparatus 1 (YES in BLOCK 101) is as follows.

When the controller 11 detects that an input image signal input to the image processing module 13 is a 2D image signal (2D image format) (YES in BLOCK 111), it determines that the 3D conversion instruction is valid, and instructs the image processing module 13 to execute the 3D conversion. Then, the 3D conversion processing module 131 of the image processing module 13 converts the input image signal into a 3D image signal, and outputs the 3D image signal (BLOCK 114). The liquid crystal panel 19 displays a 3D image based on the converted 3D image signal (BLOCK 115). That is, when the controller 11 detects that a source image corresponds to 2D content, it determines that the 3D conversion instruction is valid.

When the controller 11 detects that an input image signal input to the image processing module 13 is a 3D image signal (3D image format) (YES in BLOCK 121), it determines that the 3D conversion instruction is invalid, and does not issue any 3D conversion instruction to the image processing module 13. Then, the 3D conversion processing module 131 of the image processing module 13 does not convert the input image signal into a 3D image signal. Hence, the image processing module 13 outputs the input image signal intact, and the liquid crystal panel 19 displays an image based on the input image signal (BLOCK 125). That is, when the controller 11 detects that a source image corresponds to 3D content, it determines that the 3D conversion instruction is invalid. In this case, since the input image signal is a 3D image signal, the controller 11 can also control to output guidance information indicating that the 3D conversion instruction is canceled, and the input image signal is displayed intact.

(2) Second image conversion control executed when a 3D conversion instruction is input by the 3D conversion key 141 of the image display apparatus 1 (YES in BLOCK 101) is as follows.

When the controller 11 detects that an input image signal input to the image processing module 13 is a 2D image signal (2D image format) (YES in BLOCK 111), and also detects that 3D conversion processing by the 3D conversion processing module 231 of the image playback apparatus 2 is set (YES in BLOCK 112), it instructs the image playback apparatus 2 (source apparatus of the input image signal) to stop (cancel) the 3D conversion processing via the interface 12 (BLOCK 113). Furthermore, the controller 11 determines that the 3D conversion instruction is valid, and instructs the image processing module 13 to execute 3D conversion.

Alternatively when the controller 11 detects that an input image signal input to the image processing module 13 is a 3D image signal (3D image format), and also detects that the 3D image signal is an image signal 3D-converted by the 3D conversion processing module 231 of the image playback apparatus 2, it instructs the image playback apparatus 2 (source apparatus of the input image signal) to stop (cancel) the 3D conversion processing via the interface 12. Furthermore, the controller 11 determines that the 3D conversion instruction is valid, and instructs the image processing module 13 to execute 3D conversion.

The controller 21 of the image playback apparatus 2 receives the cancel instruction via the interface 22, and instructs the 3D conversion processing module 231 to cancel the 3D conversion processing. In response to this, the image processing module 23 outputs an original image signal (2D image signal). That is, the image display apparatus 1 can receive the original image signal (2D image signal) via the interface 12, and the image processing module 13 can receive the original image signal (2D image signal). Also, since the image processing module 13 receives the 3D conversion instruction from the controller 11, the 3D conversion processing module 131 converts the original image signal (2D image signal) into a 3D image signal, and outputs the 3D image signal (BLOCK 114). The liquid crystal panel 19 displays a 3D image based on the converted 3D image signal (BLOCK 115).

Also, when the controller 11 detects that an input image signal input to the image processing module 13 is a 3D image signal (3D image format) (YES in BLOCK 121), and also detects that 2D conversion processing by the 2D conversion processing module 232 of the image playback apparatus 2 is set (YES in BLOCK 122), it instructs the image playback apparatus 2 (source apparatus of the input image signal) to stop (cancel) the 2D conversion processing via the interface 12 (BLOCK 123). Furthermore, the controller 11 determines that the 3D conversion instruction is invalid, and does not issue any 3D conversion instruction to the image processing module 13.

Alternatively when the controller 11 detects that an input image signal input to the image processing module 13 is a 2D image signal (2D image format), and also detects that the 2D image signal is an image signal 2D-converted by the 2D conversion processing module 232 of the image playback apparatus 2, it instructs the image playback apparatus 2 (source apparatus of the input image signal) to stop (cancel) the 2D conversion processing via the interface 12. Furthermore, the controller 11 determines that the 3D conversion instruction is invalid, and does not issue any 3D conversion instruction to the image processing module 13.

The controller 21 of the image playback apparatus 2 receives the cancel instruction via the interface 22, and instructs the 2D conversion processing module 232 to cancel the 2D conversion processing. In response to this, the image processing module 23 outputs an original image signal (3D image signal). That is, the image display apparatus 1 can receive the original image signal (3D image signal) via the interface 12, and the image processing module 13 can receive the original image signal (3D image signal). Since the image processing module 13 does not receive any 3D conversion instruction from the controller 11, it outputs the input image signal intact, and the liquid crystal panel 19 displays an image based on the input image signal (BLOCK 125). In this case, since the input image signal is a 3D image signal, the controller 11 can also control to output guidance information indicating that the 3D conversion instruction is canceled, and the input image signal is displayed intact.

(3) Third image conversion control executed when a 2D conversion instruction is input by the 2D conversion key 142 of the image display apparatus 1 (YES in BLOCK 102) is as follows.

When the controller 11 detects that an input image signal input to the image processing module 13 is a 3D image signal (3D image format) (YES in BLOCK 131), it determines that the 2D conversion instruction is valid, and instructs the image processing module 13 to execute 2D conversion. Then, the 2D conversion processing module 132 of the image processing module 13 converts the input image signal into a 2D image signal, and outputs the 2D image signal (BLOCK 134), and the liquid crystal panel 19 displays a 2D image based on the converted 2D image signal (BLOCK 135). That is, when the controller 11 detects that a source image corresponds to 3D content, it determines that the 2D conversion instruction is valid.

When the controller 11 detects that an input image signal input to the image processing module 13 is a 2D image signal (2D image format) (YES in BLOCK 141), it determines that the 2D conversion instruction is invalid, and does not issue any 2D conversion instruction to the image processing module 13. Then, the 2D conversion processing module 132 of the image processing module 13 does not convert the input image signal into a 2D image signal. Hence, the image processing module 13 outputs the input image signal intact, and the liquid crystal panel 19 displays an image based on the input image signal (BLOCK 145). That is, when the controller 11 detects that a source image corresponds to 2D content, it determines that the 2D conversion instruction is invalid. In this case, since the input image signal is a 2D video signal, the controller 11 can also control to output guidance information indicating that the 2D conversion instruction is canceled, and the input image signal is displayed intact.

(4) Fourth image conversion control executed when a 2D conversion instruction is input by the 2D conversion key 142 of the image display apparatus 1 (YES in BLOCK 102) is as follows.

When the controller 11 detects that an input image signal input to the image processing module 13 is a 3D image signal (3D image format) (YES in BLOCK 131), and also detects that 2D conversion processing by the 2D conversion processing module 232 of the image playback apparatus 2 is set (YES in BLOCK 132), it instructs the image playback apparatus 2 (source apparatus of the input image signal) to stop (cancel) the 2D conversion processing via the interface 12 (BLOCK 133). Furthermore, the controller 11 determines that the 2D conversion instruction is valid, and instructs the image processing module 13 to execute 2D conversion.

Alternatively when the controller 11 detects that an input image signal input to the image processing module 13 is a 2D image signal (2D image format), and also detects that the 2D image signal is an image signal 2D-converted by the 2D conversion processing module 232 of the image playback apparatus 2, it instructs the image playback apparatus 2 (source apparatus of the input image signal) to stop (cancel) the 2D conversion processing via the interface 12. Furthermore, the controller 11 determines that the 2D conversion instruction is valid, and instructs the image processing module 13 to execute 2D conversion.

The controller 21 of the image playback apparatus 2 receives the cancel instruction via the interface 22, and instructs the 2D conversion processing module 232 to cancel the 2D conversion processing. In response to this, the image processing module 23 outputs an original image signal (3D image signal). That is, the image display apparatus 1 can receive the original image signal (3D image signal) via the interface 12, and the image processing module 13 can receive the original image signal (3D image signal). Also, since the image processing module 13 receives the 2D conversion instruction from the controller 11, the 2D conversion processing module 132 converts the original image signal (3D image signal) into a 2D image signal, and outputs the 2D image signal (BLOCK 134). The liquid crystal panel 19 displays a 2D image based on the converted 2D image signal (BLOCK 135).

Also, when the controller 11 detects that an input image signal input to the image processing module 13 is a 2D image signal (2D image format) (YES in BLOCK 141), and also detects that 3D conversion processing by the 3D conversion processing module 231 of the image playback apparatus 2 is set (YES in BLOCK 142), it instructs the image playback apparatus 2 (source apparatus of the input image signal) to stop (cancel) the 3D conversion processing via the interface 12 (BLOCK 143). Furthermore, the controller 11 determines that the 2D conversion instruction is invalid, and does not issue any 2D conversion instruction to the image processing module 13.

Alternatively when the controller 11 detects that an input image signal input to the image processing module 13 is a 3D image signal (3D image format), and also detects that the 3D image signal is an image signal 3D-converted by the 3D conversion processing module 232 of the image playback apparatus 2, it instructs the image playback apparatus 2 (source apparatus of the input image signal) to stop (cancel) the 3D conversion processing via the interface 12. Furthermore, the controller 11 determines that the 2D conversion instruction is invalid, and does not issue any 2D conversion instruction to the image processing module 13.

The controller 21 of the image playback apparatus 2 receives the cancel instruction via the interface 22, and instructs the 3D conversion processing module 231 to cancel the 3D conversion processing. In response to this, the image processing module 23 outputs an original image signal (2D image signal). That is, the image display apparatus 1 can receive the original image signal (2D image signal) via the interface 12, and the image processing module 13 can receive the image processing module 13. Since the image processing module 13 does not receive any 2D conversion instruction from the controller 11, it outputs the input image signal intact, and the liquid crystal panel 19 displays an image based on the input image signal (BLOCK 145). In this case, since the input image signal is a 2D image signal, the controller 11 can also control to output guidance information indicating that the 2D conversion instruction is canceled, and the input image signal is displayed intact.

(5) Type determination of an input image signal is executed as follows.

The controller 11 can detect based on attribute information (that in a header) in input image data including an input image signal whether the input image signal corresponds to a 3D image signal (3D image format) or a 2D image signal (2D image format). Alternatively the image processing module analyzes, for example, the frame configuration of the input image signal, and can detect whether the input image signal corresponds to a 3D image signal (3D image format) or a 2D image signal (2D image format). For example, based on the analysis result of the input image signal, when it is revealed by comparing images of even and odd frames which configure the input image signal that the output format of the input image signal is a format for alternately outputting images of even and odd frames for the right and left eyes, it can be determined that the input image signal corresponds to a 3D image signal (3D image format).

Also, the controller 11 can detect based on attribute information (that in a header) in input image data including an input image signal whether the input image signal corresponds to a 3D image signal 3D-converted by a device such as the image playback apparatus 2 or a 2D image signal 2D-converted by a device such as the image playback apparatus 2.

With the aforementioned processing, the image display apparatus 1 can appropriately control the image conversion as the situation demands. For example, even when a 3D conversion instruction input, if an input image signal is a 3D image signal (3D image format), the image display apparatus 1 determines that the 3D conversion instruction is invalid. Then, the 3D image signal can be prevented from undergoing another 3D conversion.

When an input image signal is a 3D image signal (3D image format) which has undergone the 3D conversion processing by the image playback apparatus 2, or when an input image signal is about to undergo the 3D conversion processing by the image playback apparatus 2, the image display apparatus 1 instructs the image playback apparatus 2 to stop the 3D conversion processing in response to the 3D conversion instruction, and then determines that the 3D conversion instruction is valid (that is, it determines that the 3D conversion processing by the 3D conversion processing module 131 is valid). Then, a 3D image signal supplied from the image playback apparatus 2 can be prevented from undergoing another 3D conversion by the 3D conversion processing module 131 of the image display apparatus 1.

Note that when the image display apparatus 1 compares a 3D conversion processing capability of the 3D conversion processing module 131 (to be referred to as a self 3D conversion processing capability hereinafter) and that of the 3D conversion processing module 231 (to be referred to as a partner's 3D conversion processing capability), and determines that the self 3D conversion processing capability is superior to the partner's 3D conversion processing capability, it may instruct the image playback apparatus 2 to stop the 3D conversion processing in response to the 3D conversion instruction, and may then determine that the 3D conversion instruction is valid, as described above.

When the image display apparatus 1 determines that the self 3D conversion processing capability is inferior to the partner's 3D conversion processing capability, it may instruct the image playback apparatus 2 to execute the 3D conversion processing in response to the 3D conversion instruction, and may then determine that the 3D conversion instruction is invalid.

Likewise, even when a 2D conversion instruction is input, if an input image signal is a 2D image signal (2D image format), the image display apparatus 1 determines that the 2D conversion instruction is invalid. In this way, the 2D image signal can be prevented from undergoing another 2D conversion.

Second Embodiment

With 3D televisions likely to become exponentially prevalent, it is expected that as package media (cell videos) offered by a content provider, 2D-image package media and 3D-image package media of identical content will be available in parallel in the future.

When 2D images of the 2D-image package media are converted into 3D images, their image quality often drops, and it is often proper to play back the 2D images of the 2D-image package media intact. Alternatively it is often proper to play back original 2D images prepared by the content provider intact.

Likewise, when 3D images of the 3D-image package media are converted into 2D images, their image quality often drops, and it is often proper to play back the 3D images of the 3D-image package media intact. Alternatively it is often proper to play back original 3D images prepared by the content provider intact.

Conventionally, it is not supposed to deal the 2D- and 3D-image package media. Also, it is not supposed that 2D images of the 2D-image package media are converted into 3D images or 3D images of the 3D-package media are converted into 2D images due to the practical application of the 2D-3D conversion technique. That is, image conversion control required to appropriately play back 2D- and 3D-image package media has not been discussed.

Figure 7:
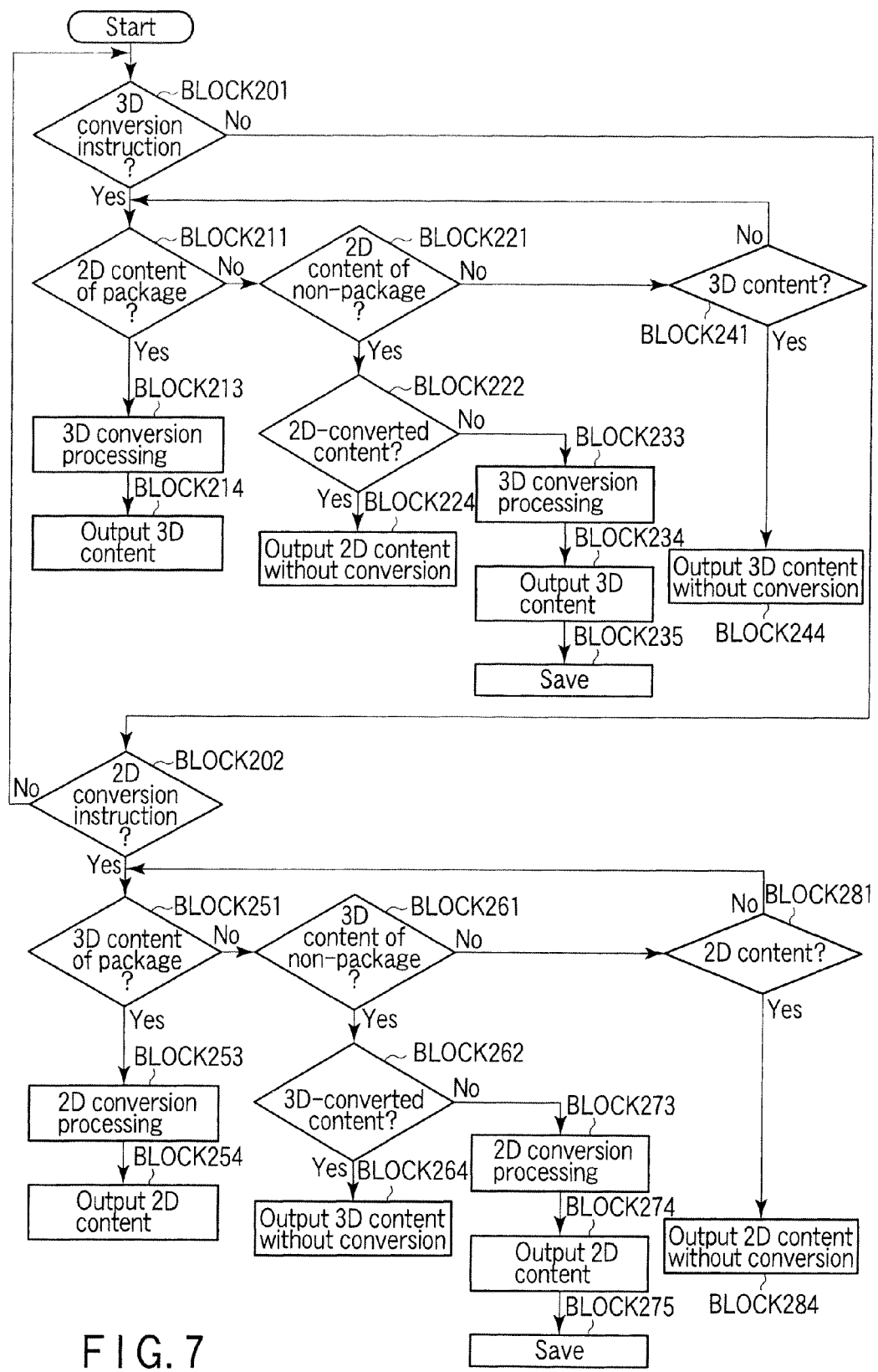
FIG. 7 is a flowchart showing the fifth and sixth image conversion control examples and first and second recording control examples to be described in the second embodiment.

Fifth and sixth image conversion control processes required to appropriately play back the 2D- and 3D-image package media will be described below (see FIGS. 6 and 7)

(1) Fifth image conversion control executed when a 3D conversion instruction is input by the 3D conversion key 141 of the image display apparatus 1 (YES in BLOCK 201) is as follows.

When the controller 11 detects that an input image signal input to the image processing module 13 is an original 2D image signal (2D image format) which has never undergone 2D conversion processing, it determines that the 3D conversion instruction is valid, and instructs the image processing module 13 to execute 3D conversion. For example, when the controller 11 detects that an input image signal is an original 2D image signal (2D image format) of a package medium (commercially available) (YES in BLOCK 211), or that an input image signal is an original 2D image signal (2D image format) of a non-package medium (not commercially available), which has never undergone the 2D conversion processing (YES in BLOCK 221, NO in BLOCK 222), it determines that the 3D conversion instruction is valid, and instructs the image processing module 13 to execute 3D conversion.

Then, the 3D conversion processing module 131 of the image processing module 13 converts the input image signal into a 3D image signal, and outputs the 3D image signal (BLOCK 213, BLOCK 233), and the liquid crystal panel 19 displays a 3D image based on the converted 3D image signal (BLOCK 214, BLOCK 234). That is, when the controller 11 detects that a source image corresponds to original 2D content which has never undergone 2D conversion processing, it determines that the 3D conversion instruction is valid. Note that when the controller 11 detects that an input image signal is a copyrighted 2D image signal, it can judge that this input image signal is a 2D image signal of a package medium Alternatively when the controller 11 detects that an input image signal input to the image processing module 13 is a non-original 2D-converted image signal (2D image format) (YES in BLOCK 222), it determines that the 3D conversion instruction is invalid. Alternatively when the controller 11 detects that an input image signal input to the image processing module 13 is a 3D image signal (3D image format) (YES in BLOCK 241), it also determines that the 3D conversion instruction is invalid. For example, when the controller 11 detects that an input image signal is a 3D image signal (3D image format) of a package medium (commercially available), that an input image signal is a 3D image signal (3D image format) of a non-package medium (not commercially available), or that an input image signal is a non-original 3D-converted image signal (3D image format), it determines that the 3D conversion instruction is invalid.

As a result, the 3D conversion processing module 131 of the image processing module 13 does not convert the input image signal into a 3D image signal. Hence, the image processing module 13 outputs the input image signal intact, and the liquid crystal panel 19 displays an image based on the input image signal (BLOCK 224, BLOCK 244). Note that when the controller 11 detects that an input image signal is a copyrighted 3D image signal, it can judge that this input image signal is a 3D image signal of a package medium.

The non-original 2D-converted image signal is, for example, an image signal which was previously 2D-converted by the 2D conversion processing module 132 or that which was previously 2D-converted by the 2D conversion processing module 232. Likewise, the non-original 3D-converted image signal is, for example, an image signal which was previously 3D-converted by the 3D conversion processing module 131 or that which was previously 3D-converted by the 3D conversion processing module 231.

(2) Sixth image conversion control executed when a 2D conversion instruction is input by the 2D conversion key 142 of the image display apparatus 1 (YES in BLOCK 202) is as follows.

When the controller 11 detects that an input image signal input to the image processing module 13 is an original 3D image signal (3D image format), which has never undergone 3D conversion processing, it is determined that a 2D conversion instruction is valid, and instructs the image processing module 13 to execute 2D conversion. For example, when the controller 11 detects that an input image signal is an original 3D image signal (3D image format) of a package medium (commercially available) (YES in BLOCK 251) or that an input image signal is an original 3D image signal (3D image format), which has never undergone 3D conversion processing, of a non-package medium (not commercially available) (NO in BLOCK 262), it determines that the 2D conversion instruction is valid, and instructs the image processing module 13 to execute 2D conversion.

Thus, the 2D conversion processing module 132 of the image processing module 13 converts the input image signal into a 2D image signal, and outputs the 2D image signal (BLOCK 253, BLOCK 273), and the liquid crystal panel 19 displays a 2D image based on the converted 2D image signal (BLOCK 254, BLOCK 274). That is, when the controller 11 detects that a source image corresponds to original 3D content which has never undergone the 3D conversion processing, it determines that the 2D conversion instruction is valid. Note that when the controller 11 detects that an input image signal is a copyrighted 3D image signal, it can judge that this input image signal is a 3D image signal of a package medium.

Alternatively when the controller 11 detects that an input image signal input to the image processing module 13 is a non-original 3D-converted image signal (3D image format) which has undergone the 3D conversion processing (YES in BLOCK 262), it determines that the 2D conversion instruction is invalid. Alternatively when the controller 11 also detects that an input image signal input to the image processing module 13 is a 2D image signal (2D image format) (YES in BLOCK 281), it determines that the 2D conversion instruction is invalid. For example, when the controller 11 detects that an input image signal is a 2D image signal (2D image format) of a package medium (commercially available), that an input image signal is a 2D image signal (2D image format) of a non-package medium (not commercially available), or that an input image signal is a non-original 2D-converted image signal (2D image format), it determines that the 2D conversion instruction is invalid.

Then, the 2D conversion processing module 132 of the image processing module 13 does not convert the input image signal into a 2D image signal. Hence, the image processing module 13 outputs the input image signal intact, and the liquid crystal panel 19 displays an image based on the input image signal (BLOCK 264, BLOCK 284). Note that when the controller 11 detects that an input image signal is a copyrighted 2D image signal, it can judge that this input image signal is a 2D image signal of a package medium.

(3) First recording control executed when a 3D conversion instruction is input by the 3D conversion key 141 of the image display apparatus 1 is as follows.

When the controller 11 detects that an input image signal input to the image processing module 13 is a 2D image signal (2D image format) of a package medium (commercially available), the input image signal is converted into a 3D image signal, and the 3D image signal is output by the aforementioned fifth image conversion control (BLOCK 224). The 3D image signal converted by this fifth image conversion control is generated from the 2D image signal of the package medium. For this reason, the controller 11 does not issue any save instruction of this 3D image signal. That is, this 3D image signal is deleted.

When the controller 11 detects that an input image signal input to the image processing module 13 is an original 2D image signal (2D image format), which has never undergone the 2D conversion processing, of a non-package medium (not commercially available), the input image signal is converted into a 3D image signal, and the 3D image signal is output by the aforementioned fifth image conversion control (BLOCK 234). The 3D image signal converted by this fifth image conversion control is generated from the original 2D image signal, which has never undergone the 2D conversion processing, of the non-package medium. For this reason, the controller 11 controls to save this 3D image signal, and the storage device 17 receives this 3D image signal via the interface 16 and saves this 3D image signal (BLOCK 235).

(4) Second recording control executed when a 2D conversion instruction is input by the 2D conversion key 142 of the image display apparatus 1 is as follows.

When the controller 11 detects that an input image signal input to the image processing module 13 is a 3D image signal (3D image format) of a package medium (commercially available), the input image signal is converted into a 2D image signal, and the 2D image signal is output by the aforementioned sixth image conversion control (BLOCK 254). The 2D image signal converted by this sixth image conversion control is generated from the 3D image signal of the package medium. For this reason, the controller 11 does not issue any save instruction of this 2D image signal. That is, this 2D image signal is deleted.

When the controller 11 detects that an input image signal input to the image processing module 13 is an original 3D image signal (3D image format), which has never undergone the 3D conversion processing, of a non-package medium (not commercially available), the input image signal is converted into a 2D image signal, and the 2D image signal is output by the aforementioned sixth image conversion control (BLOCK 274). The 2D image signal converted by this sixth image conversion control is generated from the original 3D image signal, which has never undergone the 3D conversion processing, of the non-package medium. For this reason, the controller 11 controls to save this 2D image signal, and the storage device 17 saves this 2D image signal (BLOCK 275).

(5) Type determination of an input image signal is made as follows.

The controller 11 can detect based on attribute information (that in a header) in input image data including an input image signal whether the input image signal corresponds to an original 3D image signal (3D image format), which has never undergone the 3D conversion processing, of a package medium (commercially available), an original 2D image signal (2D image format), which has never undergone the 2D conversion processing, of a package medium (commercially available), an original 3D image signal (3D image format), which has never undergone the 3D conversion processing, of a non-package medium (not commercially available), an original 2D image signal (2D image format), which has never undergone the 2D conversion processing, of a non-package medium (not commercially available), a 3D-converted image signal (3D image format), which has undergone the 3D conversion processing, of a non-package medium (not commercially available), or a 2D-converted image signal (2D image format), which has undergone the 2D conversion processing, of a non-package medium (not commercially available). Alternatively the image processing module analyzes, for example, the frame configuration of the input image signal, and can detect whether the input image signal corresponds to a 3D image signal (3D image format) or a 2D image signal (2D image format). For example, based on the analysis result of the input image signal, when it is revealed by comparing images of even and odd frames which configure the input image signal that the output format of the input image signal is a format for alternately outputting images of even and odd frames for the right and left eyes, it can be determined that the input image signal corresponds to a 3D image signal (3D image format).

With the above processing, the image display apparatus 1 can appropriately control image conversion as the situation demands. For example, even when a 3D conversion instruction is input, if an input image signal is a 3D image signal (3D image format), the image display apparatus 1 determines that the 3D conversion instruction is invalid. Then, the 3D image signal can be prevented from undergoing another 3D conversion. Also, even when a 3D conversion instruction is input, if an input image signal is a 2D-converted image signal (2D image format), which had previously undergone the 2D conversion processing, it can also determine that the 3D conversion instruction is invalid. Thus, the 2D-converted image signal, which had previously undergone the 2D conversion processing with the considerable effort, can be prevented from undergoing 3D conversion.

Note that the controller 11 may control to output guidance information which confirms the user as to whether or not to 3D-convert the previously 2D-converted image signal. If a 3D conversion instruction is input via the input unit 14, the controller 11 controls execution of the 3D conversion of the 2D-converted image signal; otherwise, the controller 11 does not control execution of the 3D conversion of the 2D-converted image signal.

Likewise, even when a 2D conversion instruction is input, if an input image signal is a 2D image signal (2D image format), the image display apparatus 1 determines that the 2D conversion instruction is invalid. Then, the 2D image signal can be prevented from undergoing another 2D conversion. Also, even when a 2D conversion instruction is input, if an input image signal is a 3D-converted image signal (3D image format), which had previously undergone the 3D conversion processing, it can also determine that the 2D conversion instruction is invalid. Thus, the 3D-converted image signal, which had previously undergone the 3D conversion processing with the considerable effort, can be prevented from undergoing 2D conversion.

Note that the controller 11 may control to output guidance information which confirms the user as to whether or not to 2D-convert the previously 3D-converted image signal. If a 2D conversion instruction is input via the input unit 14, the controller 11 controls execution of the 2D conversion of the 3D-converted image signal; otherwise, the controller 11 does not control execution of the 2D conversion of the 3D-converted image signal.

The image display apparatus 1 can effectively use the converted 2D or 3D image signal while observing the copyright protection rules. For example, when the image display apparatus 1 converts a 2D image signal of a non-package medium (not commercially available) into a 3D image signal, it controls to save this 3D image signal. After that, even when the controller 11 detects an instruction to convert the 2D image signal of the non-package medium (not commercially available) into a 3D image signal, and the 3D image signal corresponding to the 2D image signal of the non-package medium (not commercially available) has already been saved, it can read and play back the saved 3D image signal in response to the conversion instruction to a 3D image signal.

Likewise, when the image display apparatus 1 converts a 3D image signal of a non-package medium (not commercially available) into a 2D image signal, it controls to save this 2D image signal. After that, even when the controller 11 detects an instruction to convert the 3D image signal of the non-package medium (not commercially available) into a 2D image signal, and the 2D image signal corresponding to the 3D image signal of the non-package medium (not commercially available) has already been saved, it can read and play back the saved 2D image signal in response to the conversion instruction to a 2D image signal.

Third Embodiment

Note that the aforementioned first to sixth image conversion control processes have not described handling of game content. However, the image display apparatus 1 may handle game content as follows.

(1) Seventh image conversion control executed when a 3D conversion instruction is input by the 3D conversion key 141 of the image display apparatus 1 is as follows.

When the controller 11 detects that an input image signal input to the image processing module 13 is a 2D image signal of game content, it determines that the 3D conversion instruction is valid, and instructs the image processing module 13 to execute 3D conversion for game content. The game content has depth information required to stereoscopically display an image. The 3D conversion processing module 131 executes 3D conversion for the game content (that of a first algorithm)

based on this depth information to convert the 2D image signal of the game content into a 3D image signal, and outputs the 3D image signal.

When the controller 11 detects that an input image signal input to the image processing module 13 is a 2D image signal of non-game content, it determines that the 3D conversion instruction is valid, and instructs the image processing module 13 to execute 3D conversion for non-game content. The 3D conversion processing module 131 executes 3D conversion for the non-game content (that of a second algorithm) to convert the 2D image signal of the non-game content into a 3D image signal, and outputs the 3D image signal.

(2) Eighth image conversion control executed when a 2D conversion instruction is input by the 2D conversion key 142 of the image display apparatus 1 is as follows.

When the controller 11 detects that an input image signal input to the image processing module 13 is a 3D image signal of game content, it determines that the 2D conversion instruction is valid, and instructs the image processing module 13 to execute 2D conversion for game content. The game content has depth information required to stereoscopically display an image. The 2D conversion processing module 132 executes 2D conversion for the game content (that of a first algorithm) based on this depth information to convert the 3D image signal of the game content into a 2D image signal, and outputs the 2D image signal.

When the controller 11 detects that an input image signal input to the image processing module 13 is a 3D image signal of non-game content, it determines that the 2D conversion instruction is valid, and instructs the image processing module 13 to execute 2D conversion for non-game content. The 2D conversion processing module 132 executes 2D conversion for the non-game content (that of a second algorithm) to convert the 3D image signal of the non-game content into a 2D image signal, and outputs the 2D image signal.

Note that a 3D image described in the aforementioned first to third embodiments is displayed by, for example, a time-division method. The time-division method is a method which displays or presents a 3D image by combining active liquid crystal shutter spectacles and a high-speed driving display.

That is, the image display apparatus 1 can display a 3D image compatible with the time-division method. That is, the image processing module 13 outputs images for the right and left eyes while switching them for each frame, and the liquid crystal panel 19 (high-speed driving display) displays the images for the right and left eyes while switching them for each frame in response to this.

The user can view a 3D image by wearing the active liquid crystal shutter spectacles. That is, the liquid crystal shutter spectacles alternately closes shutters for the right and left eyes in response to switching of the images for the right and left eyes for each frame, and present the image for the right eye to the right eye, and that for the left eye to the left eye.

The 3D image display based on the time-division method has been exemplified. However, other 3D display methods may be adopted. For example, a 3D image display method that allows the user to view a 3D image with the naked eyes may be adopted.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image conversion apparatus comprising:
    a three-dimensional (3D) conversion instruction module configured to instruct execution of a 3D conversion required to convert an input image into a 3D image;
    a determination module configured to determine validity or invalidity of the 3D conversion instruction based on a type of the input image; and
    a converter configured to convert, based on validity determination of the 3D conversion instruction, the input image into the 3D image in response to the 3D conversion instruction,
    wherein the determination module is configured to determine invalidity of the 3D conversion instruction when the determination module determines that the input image corresponds to a 2D-converted image which has been converted from the 3D image into a 2D image.

2. The apparatus of claim 1, further comprising:
    an output module configured to output the 3D image.

3. The apparatus of claim 2, wherein the determination module is configured to determine validity of the 3D conversion instruction when the determination module determines that the input image has a two-dimensional (2D) image format for sale,
    the converter is configured to convert, based on validity determination of the 3D conversion instruction, the input image into the 3D image in response to the 3D conversion instruction, and
    the output module is configured to output the 3D image.

4. The apparatus of claim 1, further comprising:
    a recording controller configured to control recording of the 3D image converted by the converter.

5. The apparatus of claim 4, wherein the determination module is configured to determine validity of the 3D conversion instruction when the determination module determines that the input image has a 2D image format not for sale,
    the converter is configured to convert, based on validity determination of the 3D conversion instruction, the input image into the 3D image in response to the 3D conversion instruction,
    the output module is configured to output the 3D image, and
    the recording controller is configured to control recording of the 3D image converted by the converter.

6. The apparatus of claim 2, wherein
    the output module is configured to output, based on invalidity determination of the 3D conversion instruction, the input image in response to the 3D conversion instruction.

7. The apparatus of claim 6, wherein the output module is configured to output guidance information indicating that the input image corresponds to the 2D-converted image.

8. The apparatus of claim 1, further comprising:
    a two-dimensional (2D) conversion instruction module configured to instruct execution of a 2D conversion required to convert the input image into a 2D image, wherein the determination module is configured to determine validity or invalidity of the 2D conversion instruction based on a type of the input image, and
the converter is configured to convert, based on validity determination of the 2D conversion instruction, the input image into the 2D image in response to the 2D conversion instruction.

9. The apparatus of claim 8, further comprising:
an output module configured to output the 2D image.

10. The apparatus of claim 9, wherein the determination module is configured to determine validity of the 2D conversion instruction when the determination module determines that the input image has a 3D image format for sale,
the converter is configured to convert, based on validity determination of the 2D conversion instruction, the input image into the 2D image in response to the 2D conversion instruction, and
the output module is configured to output the 2D image.

11. The apparatus of claim 9, further comprising:
a recording controller configured to control recording of the 2D image converted by the converter.

12. The apparatus of claim 11, wherein the determination module is configured to determine validity of the 2D conversion instruction when the determination module determines that the input image has a 3D image format not for sale,
the converter is configured to convert, based on validity determination of the 2D conversion instruction, the input image into the 2D image in response to the 2D conversion instruction,
the output module is configured to output the 2D image, and
the recording controller is configured to control recording of the 2D image converted by the converter.

13. The apparatus of claim 9, wherein the determination module is configured to determine invalidity of the 2D conversion instruction when the determination module determines that the input image corresponds to a 3D-converted image which has been converted from the 2D image into the 3D image, and
the output module is configured to output, based on invalidity determination of the 2D conversion instruction, the input image in response to the 2D conversion instruction.

14. The apparatus of claim 13, wherein the output module is configured to output guidance information indicating that the input image corresponds to the 3D-converted image.

15. An image conversion method comprising:
determining validity or invalidity of an instruction of a three-dimensional (3D) conversion required to convert an input image into a 3D image based on a type of the input image, and determining invalidity of the 3D conversion instruction when the input image corresponds to a 2D-converted image which has been converted from the 3D image into a two-dimensional (2D) image; and
converting, based on validity determination of the 3D conversion instruction, the input image into the 3D image in response to the 3D conversion instruction.

\* \* \* \* \*